United States Patent
Kido et al.

(10) Patent No.: US 12,435,396 B2
(45) Date of Patent: Oct. 7, 2025

(54) CEMENTED CARBIDE AND CUTTING TOOL

(71) Applicant: Sumitomo Electric Industries, Ltd., Osaka (JP)

(72) Inventors: Yasuki Kido, Osaka (JP); Yoshihiro Kimura, Osaka (JP); Anongsack Paseuth, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/714,829

(22) PCT Filed: Sep. 26, 2023

(86) PCT No.: PCT/JP2023/035008
§ 371 (c)(1),
(2) Date: May 30, 2024

(87) PCT Pub. No.: WO2025/069212
PCT Pub. Date: Apr. 3, 2025

(65) Prior Publication Data
US 2025/0101551 A1  Mar. 27, 2025

(51) Int. Cl.
*C22C 29/08* (2006.01)
*B22F 3/16* (2006.01)
(Continued)

(52) U.S. Cl.
CPC .............. *C22C 29/08* (2013.01); *B22F 3/16* (2013.01); *B22F 3/24* (2013.01); *B23B 27/148* (2013.01);
(Continued)

(58) Field of Classification Search
CPC ....... C22C 19/07; C22C 29/067; C22C 29/08; B23B 27/148
See application file for complete search history.

(56) References Cited

U.S. PATENT DOCUMENTS

| | | | |
|---|---|---|---|
| 5,288,676 A * | 2/1994 | Shimada | C22C 29/08 75/242 |
| 6,514,456 B1 * | 2/2003 | Lackner | B23H 9/08 148/423 |
| 2012/0040183 A1 * | 2/2012 | Kelkar | B22F 3/1035 156/60 |

FOREIGN PATENT DOCUMENTS

| | | |
|---|---|---|
| CN | 103774026 A | 5/2014 |
| EP | 3147377 A1 | 3/2017 |

(Continued)

OTHER PUBLICATIONS

International Search Report and Written Opinion mailed on Dec. 19, 2023, received for PCT Application No. PCT/JP2023/035008, filed on Sep. 26, 2023, 13 pages including English Translation.

*Primary Examiner* — Sally A Merkling
*Assistant Examiner* — Sean P. O'Keefe
(74) *Attorney, Agent, or Firm* — XSENSUS LLP (57) ABSTRACT

Provided is a cemented carbide comprising a plurality of tungsten carbide grains and a binder phase, wherein the cemented carbide comprises the tungsten carbide grains and the binder phase in a total of 89% by volume or more, the cemented carbide comprises 1.5% by volume or more and 23% by volume or less of the binder phase, the binder phase contains 40% by mass or more of cobalt, the binder phase further contains at least one first element selected from the group consisting of silicon, phosphorus, germanium, tin, rhenium, ruthenium, osmium, iridium, and platinum, the first element is not segregated in a first interface region between the tungsten carbide grains that are adjacent to each other, and the first element is not segregated in a second interface region between the tungsten carbide grain and binder phase that are adjacent to each other.

5 Claims, 5 Drawing Sheets

(51) Int. Cl.
    *B22F 3/24*          (2006.01)
    *B23B 27/14*        (2006.01)
    *C22C 1/051*        (2023.01)
    *C22C 19/07*        (2006.01)
    *C22C 29/02*        (2006.01)
    *C22C 29/06*        (2006.01)

(52) U.S. Cl.
    CPC .............. *C22C 1/051* (2013.01); *C22C 19/07* (2013.01); *C22C 29/02* (2013.01); *C22C 29/067* (2013.01); *B22F 2003/248* (2013.01); *B22F 2301/15* (2013.01); *B22F 2301/25* (2013.01); *B22F 2301/30* (2013.01); *B22F 2302/10* (2013.01); *B22F 2302/15* (2013.01); *B22F 2998/10* (2013.01); *B22F 2999/00* (2013.01)

(56) References Cited

FOREIGN PATENT DOCUMENTS

| | | |
|---|---|---|
| JP | 2004-131769 A | 4/2004 |
| JP | 2010-012552 A | 1/2010 |
| WO | 2015/178484 A1 | 11/2015 |
| WO | 2019/123764 A1 | 6/2019 |

\* cited by examiner

CEMENTED CARBIDE AND CUTTING TOOL

CROSS-REFERENCE TO RELATED APPLICATION

The present application is based on PCT filing PCT/JP2023/035008, filed Sep. 26, 2023, the entire contents of which are incorporated herein by reference.

TECHNICAL FIELD

The present disclosure relates to a cemented carbide and a cutting tool.

BACKGROUND ART

Conventionally, cemented carbides comprising a plurality of tungsten carbide grains and a binder phase have been utilized as materials for cutting tools (PTL 1).

CITATION LIST

Patent Literature

PTL 1. Japanese Patent Laying-Open No. 2004-131769

SUMMARY OF INVENTION

A cemented carbide of the present disclosure is
a cemented carbide comprising a plurality of tungsten carbide grains and a binder phase,
wherein the cemented carbide comprises the tungsten carbide grains and the binder phase in a total of 89% by volume or more,
the cemented carbide comprises 1.5% by volume or more and 23% by volume or less of the binder phase,
the binder phase contains 40% by mass or more of cobalt, the binder phase further contains at least one first element selected from the group consisting of silicon, phosphorus, germanium, tin, rhenium, ruthenium, osmium, iridium, and platinum,
the first element is not segregated in a first interface region between the tungsten carbide grains that are adjacent to each other, and
the first element is not segregated in a second interface region between the tungsten carbide grain and binder phase that are adjacent to each other.

DETAILED DESCRIPTION

Problem to be Solved by the Present Disclosure

In recent years, workpieces have become increasingly difficult to cut in cutting processes, and the conditions under which cutting tools are used have become more severe. For example, in printed circuit boards, the expansion of 5G (5th generation mobile communication system) has led to higher capacity of information, and printed circuit boards are required to have even higher heat resistance. In order to improve the heat resistance of printed circuit boards, technologies have been developed to improve the heat resistance of the resins and glass fillers that constitute the printed circuit boards. Meanwhile, this has made printed circuit boards increasingly difficult to cut. As a result, cutting tools tend to be prone to abrasion and breakage in the processing of printed circuit boards.

Therefore, an object of the present disclosure is to provide a cemented carbide that enables a longer service life of cutting tools even in the case where it is used as a material for cutting tools, especially for drilling holes in printed circuit boards, and a cutting tool comprising the same.

Advantageous Effect of the Present Disclosure

According to the present disclosure, it is possible to provide a cemented carbide that enables a longer service life of cutting tools even in the case where it is used as a material for cutting tools, especially for drilling holes in printed circuit boards, and a cutting tool comprising the same.

Description of Embodiments

First, embodiments of the present disclosure will be listed and described.

(1) A cemented carbide of the present disclosure is
a cemented carbide comprising a plurality of tungsten carbide grains and a binder phase,
wherein the cemented carbide comprises the tungsten carbide grains and the binder phase in a total of 89% by volume or more,
the cemented carbide comprises 1.5% by volume or more and 23% by volume or less of the binder phase,
the binder phase contains 40% by mass or more of cobalt, the binder phase further contains at least one first element selected from the group consisting of silicon, phosphorus, germanium, tin, rhenium, ruthenium, osmium, iridium, and platinum,
the first element is not segregated in a first interface region between the tungsten carbide grains that are adjacent to each other, and
the first element is not segregated in a second interface region between the tungsten carbide grain and binder phase that are adjacent to each other.

According to the present disclosure, it is possible to provide a cemented carbide that enables a longer service life of cutting tools even in the case where it is used as a material for cutting tools, especially for drilling holes in printed circuit boards.

(2) In the above (1), in the binder phase, the percentage $\{M1/(M1+M2)\} \times 100$ of the mass M1 of the first element to the total M1+M2 of the mass M1 of the first element and the mass M2 of cobalt may be 1% or more and 6% or less. Here, the units of the mass M1 and the mass M2 are the same. According to this, it is possible to provide a cemented carbide that enables a longer tool life of cutting tools.

(3) In the above (1) or (2),
the cemented carbide may be free from:
an intermetallic compound composed of two or more elements selected from the group consisting of the first element, cobalt, and tungsten, and a first compound composed of at least one element selected from the group consisting of the first element, cobalt, and tungsten, and at least one element selected from the group consisting of carbon, nitrogen, and oxygen, and here, the first compound does not include tungsten carbide.

According to this, a decrease in the strength of the cemented carbide is suppressed.

(4) A cutting tool of the present disclosure is a cutting tool comprising a cutting edge composed of the cemented carbide according to any of the above (1) to (3).

According to this, it is possible to provide a cutting tool having a long tool life even in the case where it is used especially for drilling holes in printed circuit boards.

Details of Embodiments of the Present Disclosure

Hereinafter, specific examples of the cemented carbide and cutting tool of the present disclosure will be described with reference to drawings. In the drawings of the present disclosure, the same reference signs represent the same portions or equivalent portions. In addition, dimensional relationships such as length, width, thickness, and depth are changed as appropriate for clarity and simplicity in the drawings and do not necessarily represent actual dimensional relationships.

In the present disclosure, the expression "A to B" represents a range of lower to upper limits (i.e., A or more and B or less), and in the case where no unit is indicated for A and a unit is indicated only for B, the unit of A is the same as the unit of B.

In the case where a compound or the like is expressed by a chemical formula in the present disclosure and an atomic ratio is not particularly limited, it is assumed that all the conventionally known atomic ratios are included, and the atomic ratio is not necessarily limited only to one in the stoichiometric range.

In the present disclosure, in the case where one or more numerical values are each provided as a lower limit and an upper limit of a numerical range, it is considered that a combination of any one of the numerical values provided in the lower limit and any one of the numerical values provided in the upper limit is also disclosed. For example, in the case where a1 or more, b1 or more, and c1 or more are described as lower limits, and a2 or less, b2 or less, and c2 or less are described as upper limits, it is considered that a1 or more and a2 or less, a1 or more and b2 or less, a1 or more and c2 or less, b1 or more and a2 or less, b1 or more and b2 or less, b1 or more and c2 or less, c1 or more and a2 or less, c1 or more and b2 or less, and c1 or more and c2 or less are disclosed.

Embodiment 1: Cemented Carbide

Figure 1:
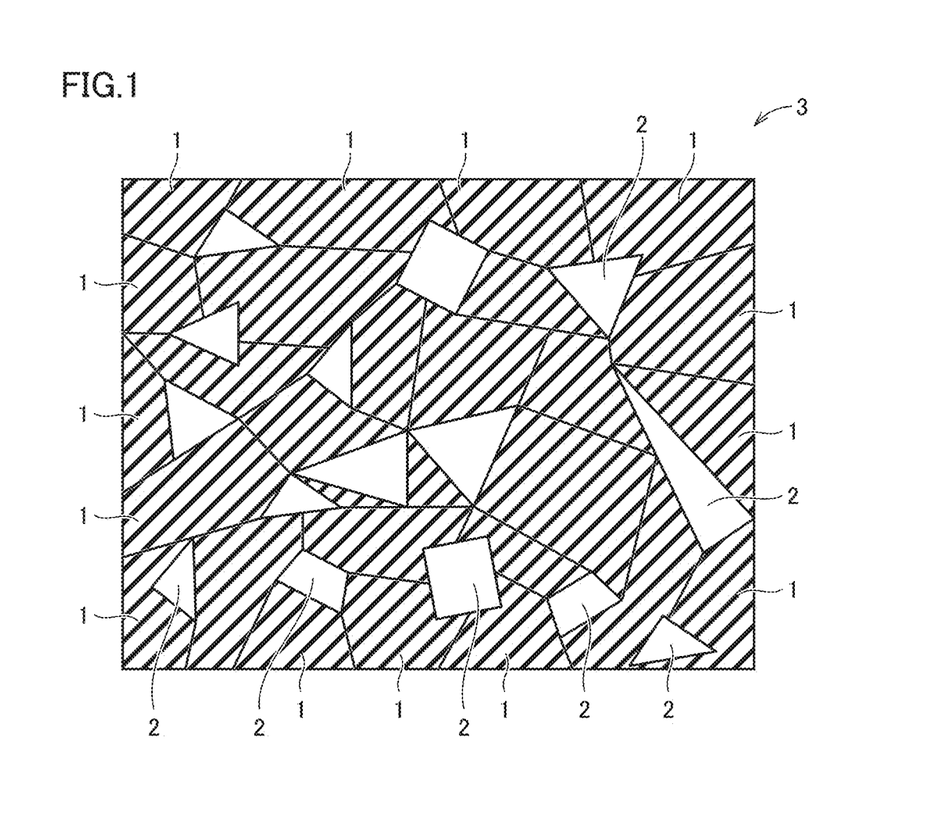
FIG. 1 is a schematic cross-sectional view of a cemented carbide according to Embodiment 1.

A cemented carbide according to one embodiment of the present disclosure will be described with reference to FIG. 1.

A cemented carbide 3 according to one embodiment of the present disclosure (hereinafter, also referred to as "Embodiment 1") is cemented carbide 3 comprising a plurality of tungsten carbide grains 1 and a binder phase 2, wherein cemented carbide 3 comprises tungsten carbide grains 1 and binder phase 2 in a total of 89% by volume or more, cemented carbide 3 comprises 1.5% by volume or more and 23% by volume or less of binder phase 2, binder phase 2 contains 40% by mass or more of cobalt, binder phase 2 further contains at least one first element selected from the group consisting of silicon, phosphorus, germanium, tin, rhenium, ruthenium, osmium, iridium, and platinum, the first element is not segregated in a first interface region between tungsten carbide grains 1 that are adjacent to each other, and the first element is not segregated in a second interface region between tungsten carbide grain 1 and binder phase 2 that are adjacent to each other.

The cemented carbide of Embodiment 1 can provide a cemented carbide that enables a longer service life of cutting tools even in the case where it is used as a material for cutting tools, especially for drilling holes in printed circuit boards, and a cutting tool comprising the same. The reason for this is not clear, but may be presumed to be as follows.

The cemented carbide of Embodiment 1 comprises a plurality of tungsten carbide grains (hereinafter, also referred to as "WC grains") and a binder phase, and the total content of the WC grains and the binder phase in the cemented carbide is 89% by volume or more According to this, the cemented carbide has high hardness and strength, and a cutting tool comprising the cemented carbide can have excellent abrasion resistance and breakage resistance.

The cemented carbide of Embodiment 1 comprises 1.5% by volume or more and 23% by volume or less of the binder phase, and the binder phase contains 40% by mass or more of cobalt. According to this, the cemented carbide has high hardness and strength, and a cutting tool comprising the cemented carbide can have excellent abrasion resistance and breakage resistance.

In the cemented carbide of Embodiment 1, the binder phase contains at least one first element selected from the group consisting of silicon, phosphorus, germanium, tin, rhenium, ruthenium, osmium, iridium, and platinum. Furthermore, the first element is not segregated in a first interface region between the tungsten carbide grains that are adjacent to each other, and the first element is not segregated in a second interface region between the tungsten carbide grain and binder phase that are adjacent to each other. According to this, the interface strength between the tungsten carbide grains and the interface strength between the tungsten carbide grain and binder phase in the cemented carbide are further improved, and falling of the tungsten carbide grains at the time of cutting processes is suppressed. Therefore, a cutting tool using the cemented carbide as a material can have a long tool life. Furthermore, the hole positional accuracy of the cutting tool is also improved.

<Composition of Cemented Carbide>

The cemented carbide of Embodiment 1 comprises the tungsten carbide grains and the binder phase in a total of 89% by volume or more. As a result, the hardness of the cemented carbide can be enhanced. The cemented carbide may comprise the tungsten carbide grains and the binder phase in a total of 89% by volume or more and 100% by volume or less, may comprise them in a total of 90% by volume or more and 100% by volume or less, may comprise them in a total of 91% by volume or more and 100% by volume or less, or may comprise them in a total of 92% by volume or more and 100% by volume or less.

The cemented carbide of Embodiment 1 comprises 1.5% by volume or more and 23% by volume or less of the binder phase. As a result, the hardness and toughness of the cemented carbide can be enhanced. The content of the binder phase in the cemented carbide may be 2.0% by volume or more and 19.0% by volume or less, may be 3.0% by volume or more and 18.0% by volume or less, or may be 4.0% by volume or more and 17.0% by volume or less.

The cemented carbide of Embodiment 1 can be composed of the plurality of tungsten carbide grains and the binder phase. In this case, the cemented carbide can comprise impurities to the extent that the effects of the present disclosure are not impaired.

In addition to the tungsten carbide grains and the binder phase, the cemented carbide can comprise other phases (not shown). Examples of the other phases include carbides, nitrides, or carbonitrides containing at least one element selected from the group consisting of titanium (Ti), tantalum (Ta), niobium (Nb), zirconium (Zr), hafnium (Hf), and molybdenum (Mo). The composition of the other phases may be, for example, at least one selected from the group consisting of TiCN, TaC, NbC, ZrC, HfC, and $Mo_2C$.

The cemented carbide of Embodiment 1 can be composed of the tungsten carbide grains, the binder phase, and the other phases. In this case, the cemented carbide can comprise impurities to the extent that the effects of the present disclosure are not impaired.

The content of the other phases in the cemented carbide is permissible to the extent that the effects of the present disclosure are not impaired. For example, the content of the other phases in the cemented carbide may be more than 0% by volume and 11% by volume or less, may be more than 0% by volume and 7% by volume or less, or may be more than 0% by volume and 4% by volume or less.

The cemented carbide of Embodiment 1 can comprise impurities. Examples of the impurities include iron (Fe), calcium (Ca), silicon (Si), and sulfur (S). The content of the impurities in the cemented carbide is permissible to the extent that the effects of the present disclosure are not impaired. For example, the content of the impurities in the cemented carbide may be 0% by mass or more and less than 0.1% by mass. The content of the impurities in the cemented carbide is measured by inductively coupled plasma (ICP) emission spectroscopy "ICPS-8100"™ manufactured by Shimadzu Corporation can be used as the measurement device.

The content of the tungsten carbide grains in the cemented carbide of Embodiment 1 may be 67% by volume or more and 98.5% by volume or less, may be 70% by volume or more and 97% by volume or less, or may be 75% by volume or more and 96% by volume or less.

The method for measuring the content of the tungsten carbide grains in the cemented carbide (% by volume) and the content of the binder phase in the cemented carbide (% by volume) is as follows.

(A1) The cemented carbide is cut out at any position to expose a cross-section. The cross-section is subjected to mirror surface processing using CROSS SECTION POLISHER (manufactured by JEOL Ltd.)

(B1) The surface of the cemented carbide that has been subjected to the mirror surface processing is analyzed using an energy dispersive X-ray spectrometer attached to a scanning electron microscope (SEM-EDX) (device. Gemini 450™ manufactured by Carl Zeiss AG) to identify the elements contained in the cemented carbide.

(C1) The surface of the cemented carbide that has been subjected to the mirror surface processing is imaged using a scanning electron microscope (SEM) to obtain a backscattered electron image. The region to be imaged is set at the center of the cross-section of the cemented carbide, i.e., at a position that does not include portions where the properties clearly differ from those of the bulk portion, such as the vicinity of the surface of the cemented carbide (at a position where the entire region to be imaged is the bulk portion of the cemented carbide). The observation magnification is 5000 times. The measurement conditions are an acceleration voltage of 3 kV, a current value of 2 nA, and a working distance (WD) of 5 mm.

(D1) The region to be imaged in the above (C1) is analyzed using SEM-EDX to identify the distribution of the elements identified in the above (B1) in the region to be imaged, and an elemental mapping image is obtained.

(E1) The backscattered electron image obtained in the above (C) is imported into a computer and subjected to a binarization process using image analysis software (OpenCV, SciPy). In the image after the binarization process, the tungsten carbide grains are shown in white, and the binder phase is shown in gray to black. Note that the threshold value of the binarization varies depending on the contrast, and is thus set for each image.

(F1) The elemental mapping image obtained in the above (D1) and the image after the binarization process obtained in the above (E1) are overlapped, thereby identifying the respective regions where the tungsten carbide grains and the binder phase are present on the image after the binarization process. Specifically, the region shown in white in the image after the binarization process and the region where tungsten (W) and carbon (C) are present in the elemental mapping image correspond to the region where the tungsten carbide grains are present. The region shown in gray to black in the image after the binarization process and the region where cobalt (Co) is present in the elemental mapping image correspond to the region where the binder phase is present.

(G1) In the image after the binarization process, a rectangular measurement field of 24.9 µm×18.8 µm is set. Using the above image analysis software, the respective area percentages of the tungsten carbide grains and the binder phase are measured with the area of the entire measurement field as the denominator.

(H1) The measurement of the above (G1) is performed at five different measurement fields that are not overlapped with each other. In the present disclosure, the average of the area percentages of the tungsten carbide grains in the five measurement fields corresponds to the content (% by volume) of the tungsten carbide grains in the cemented carbide, and the average of the area percentages of the binder phase in the five measurement fields corresponds to the content (% by volume) of the binder phase in the cemented carbide.

In the case where the cemented carbide comprises other phases in addition to the WC grains and the binder phase, the content of the other phases in the cemented carbide can be obtained by subtracting the content (% by volume) of the tungsten carbide grains and the content (% by volume) of the binder phase as measured in the above procedure from the entire cemented carbide (100% by volume).

It has been confirmed that, as long as measurement is performed on the same sample, even if the cut-out location for the cross-section of the cemented carbide, the region to be imaged described in the above (C1), and the measurement field described in the above (G1) are arbitrarily set and the measurement of the content of the tungsten carbide grains and the content of the binder phase in the cemented carbide is performed multiple times according to the above procedure, there is little variation in the measurement results.

The cobalt content in the cemented carbide of Embodiment 1 may be 1.0% by mass or more and 20% by mass or less, may be 2.0% by mass or more and 15% by mass or less, or may be 3.0% by mass or more and 12% by mass or less.

A method for measuring the content of cobalt in the cemented carbide is as follows. By the same method as (A1) to (D1) of the method for measuring the content of the tungsten carbide grains and the content of the binder phase in the cemented carbide described above, analysis using SEM-EDX is performed to obtain an elemental mapping image. Based on the elemental mapping image, the region of cobalt in the cemented carbide is identified and the content of cobalt is measured. The measurement is performed at five different regions to be imaged that are not overlapped with each other. In the present disclosure, the average of the contents of cobalt in the five regions to be imaged corresponds to the content of cobalt in the cemented carbide.

It has been confirmed that, as long as measurement is performed on the same sample, even if the cut-out location for the cross-section of the cemented carbide and the region to be imaged described in the above (C1) are arbitrarily set and the measurement of the content of cobalt in the cemented carbide is performed multiple times according to the above procedure, there is little variation in the measurement results.

<Tungsten Carbide Grains>

In the cemented carbide of Embodiment 1, the tungsten carbide grains include at least any of "pure WC grains (including WC not containing any impurity elements, as well as WC in which the content of impurity elements is below the detection limit)" and "WC grains in which impurity elements are intentionally or inevitably contained therein to the extent that the effects of the present disclosure are not impaired". The content of impurities in the tungsten carbide grains (in the case where there are two or more elements constituting the impurities, their total concentration) is less than 0.1% by mass. The content of impurity elements in the tungsten carbide grains is measured by ICP emission spectroscopy.

In Embodiment 1, the average grain size of the tungsten carbide grains is not particularly restricted. The average grain size of the tungsten carbide grains can be, for example, 0.1 μm or more and 3.5 μm or less. It has been confirmed that the cemented carbide of Embodiment 1 enables a longer service life of tools even in the case where it is used as a material for cutting tools, regardless of the average grain size of the tungsten carbide grains.

<Binder Phase>

In the cemented carbide of Embodiment 1, the binder phase contains 40% by mass or more of cobalt. As a result, the cemented carbide can have excellent toughness. The cobalt content in the binder phase may be 40% by mass or more and less than 100% by mass, may be 50% by mass or more and 90% by mass or less, or may be 60% by mass or more and 80% by mass or less.

A method for measuring the cobalt content in the binder phase is as follows. By the same method as (A1) to (E1) of the method for measuring the content of the tungsten carbide grains and the content of the binder phase in the cemented carbide described above, an elemental mapping image and an image after the binarization process are obtained. The elemental mapping image and the image after the binarization process are overlapped, thereby identifying the region where the binder phase is present on the elemental mapping image. In the elemental mapping image, one rectangular measurement field of 24.9 μm×18.8 μm is set. In the region where the binder phase is present in the measurement field, the cobalt content is measured. The above measurement is performed at five different measurement fields that are not overlapped with each other. In the present disclosure, the average of the cobalt contents in the region where the binder phase is present in the five measurement fields corresponds to the cobalt content in the binder phase.

It has been confirmed that, as long as measurement is performed on the same sample, even if the cut-out location for the cross-section of the cemented carbide, the region to be imaged described in the above (C1), and the above measurement field are arbitrarily set and the measurement of the cobalt content in the binder phase is performed multiple times according to the above procedure, there is little variation in the measurement results.

In the cemented carbide of Embodiment 1, the binder phase further contains at least one first element selected from the group consisting of silicon, phosphorus, germanium, tin, rhenium, ruthenium, osmium, iridium, and platinum.

Whether the binder phase contains the first element is confirmed by the following procedure. By the same method as (A1) to (E1) of the method for measuring the content of the tungsten carbide grains and the content of the binder phase in the cemented carbide described above, an elemental mapping image and an image after the binarization process are obtained. The elemental mapping image and the image after the binarization process are overlapped, thereby identifying the region where the binder phase is present on the elemental mapping image. In the elemental mapping image, in the case where the first element is present in the region where the binder phase is present, it is confirmed that the binder phase contains the first element.

In the binder phase of the cemented carbide of Embodiment 1, the percentage $\{M1/(M1+M2)\}\times 100$ of the mass M1 of the first element to the total M1+M2 of the mass M1 of the first element and the mass M2 of cobalt may be 1% or more and 6% or less. Here, the units of the mass M1 and the mass M2 are the same. As a result, the binder phase can have more excellent hardness and more excellent toughness in combination, and therefore, a cutting tool comprising a cemented carbide comprising the binder phase can have a longer tool life. Here, the mass M1 of the first element means, in the case where the binder phase contains two or more first elements, the total mass of all first elements. The percentage $\{M1/(M1+M2)\}\times 100$ may be 2% or more and 5% or less, or may be 3% or more and 4% or less.

A method for measuring the above percentage $\{M1/(M1+M2)\}\times 100$ is as follows. By the same method as (A1) to (E1) of the method for measuring the content of the tungsten carbide grains and the content of the binder phase in the cemented carbide described above, an elemental mapping image and an image after the binarization process are obtained. The elemental mapping image and the image after the binarization process are overlapped, thereby identifying the region where the binder phase is present on the elemental mapping image. In the elemental mapping image, one rectangular measurement field of 24.9 μm×18.8 μm is set. In the region where the binder phase is present in the measurement field, the percentage $\{m1/(m1+m2)\}\times 100$ of the mass m1 of the first element to the total m1+m2 of the mass m1 of the first element and the mass m2 of cobalt is calculated. The above measurement is performed at five different measurement fields that are not overlapped with each other. In the present disclosure, the average of the percentages $(m1/(m1+m2))\times 100$ in the five measurement fields corresponds to "the percentage $\{M1/(M1+M2)\}\times 100$" in the binder phase of the cemented carbide.

It has been confirmed that, as long as measurement is performed on the same sample, even if the cut-out location for the cross-section of the cemented carbide, the region to be imaged described in the above (C1), and the above measurement field are arbitrarily set and the measurement of the percentage {M1/(M1+M2)}×100 is performed multiple times according to the above procedure, there is little variation in the measurement results.

In the cemented carbide of Embodiment 1, the binder phase can contain at least one second element selected from the group consisting of iron (Fe), nickel (Ni), and chromium (Cr) in addition to cobalt and the first element. The binder phase can be composed of cobalt, the first element, and the second element. The binder phase can be composed of cobalt, the first element, the second element, and inevitable impurities. Examples of the inevitable impurities include iron (Fe), nickel (Ni), and sulfur (S).

<First Interface Region and Second Interface Region>

In the cemented carbide of Embodiment 1, the first element is not segregated in a first interface region between the tungsten carbide grains that are adjacent to each other, and the first element is not segregated in a second interface region between the tungsten carbide grain and binder phase that are adjacent to each other. According to this, the interface strength between the tungsten carbide grains and the interface strength between the tungsten carbide grain and binder phase are improved, and the abrasion resistance and breakage resistance of the cemented carbide are improved.

Figure 2:
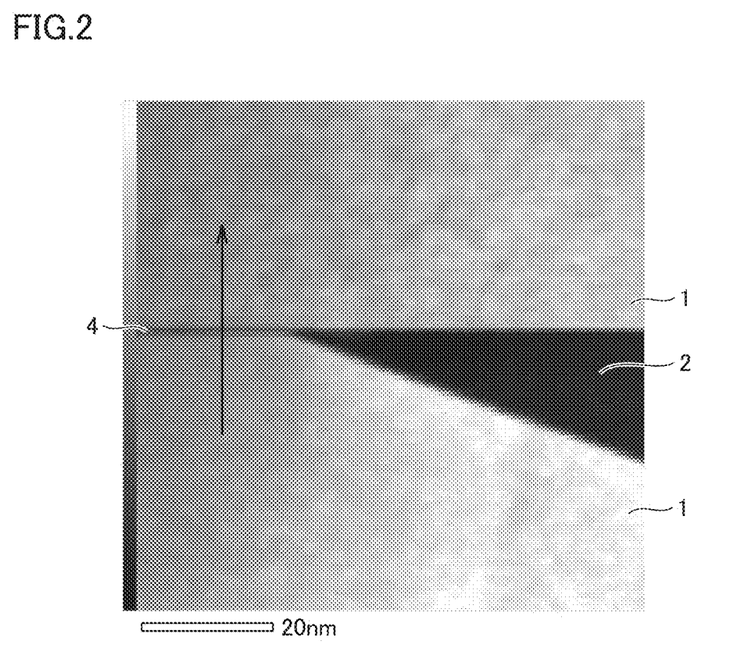
FIG. 2 shows an example of a first image of a cemented carbide according to Embodiment 1.

In the present disclosure, a method for confirming that the first element is not segregated in a first interface region between the tungsten carbide grains that are adjacent to each other in the cemented carbide will be described with reference to FIGS. 2 and 3.

(A2) The cemented carbide is thinned to a thickness of 30 to 100 nm using an argon ion slicer ("IB-09060BCIS Cryo Ion Slicer" (™) manufactured by JEOL Ltd.) under the conditions of an acceleration voltage of 6 kV and a finish of 2 kV to produce a sample for measurement. The sample for measurement is observed using TEM (transmission electron microscopy) ("JEM-ARM300F2" ™ manufactured by JEOL Ltd.) under the conditions of an acceleration voltage of 200 V at 200,000 times to obtain a first image. An example of the first image is shown in FIG. 2.

(B32) In the first image, tungsten carbide grain 1 is observed as a white to gray region, binder phase 2 is observed as a black region, and an interface 4 positioned between tungsten carbide grains 1 that are adjacent to each other is observed as a black region. In the first image, the width of interface 4 is, for example, 2 nm or less. In the first image, an interface between the tungsten carbide grains that are adjacent to each other is arbitrarily selected. Hereinafter, in the present disclosure, the tungsten carbide grains that are adjacent to each other are also referred to as a first tungsten carbide grain and a second tungsten carbide grain.

(C2) Next, positioning is performed so that the selected interface passes near the center of the image, and observation is performed adjusting the observation magnification so that the field size is 5 nm/5 nm, thereby obtaining a second image.

In the second image, the extending direction in which the interface extends is confirmed. In the direction perpendicular to the extending direction and from the first tungsten carbide grain toward the second tungsten carbide grain, line analysis is performed with an energy dispersive X-ray analyzer attached to a TEM (TEM-EDX) to obtain a graph in which the distribution of cobalt, tungsten, and the first element is measured (hereinafter, also referred to as first graph). In the case where the cemented carbide comprises two or more first elements, the distribution of each element is measured. Here, the direction perpendicular to the extending direction of the interface means the direction along a straight line that intersects at an angle of 90±5° to the tangent line in the extending direction. For example, in FIG. 2, the direction indicated by the arrow corresponds to the direction perpendicular to the extending direction of the interface. The measurement conditions at the time of the second image acquisition were as follows: an acceleration voltage of 200 kV, a camera length of 10 cm, a pixel number of 128×128 pixels, and a dwell time of 0.02 to 3 s/pixel.

Figure 3:
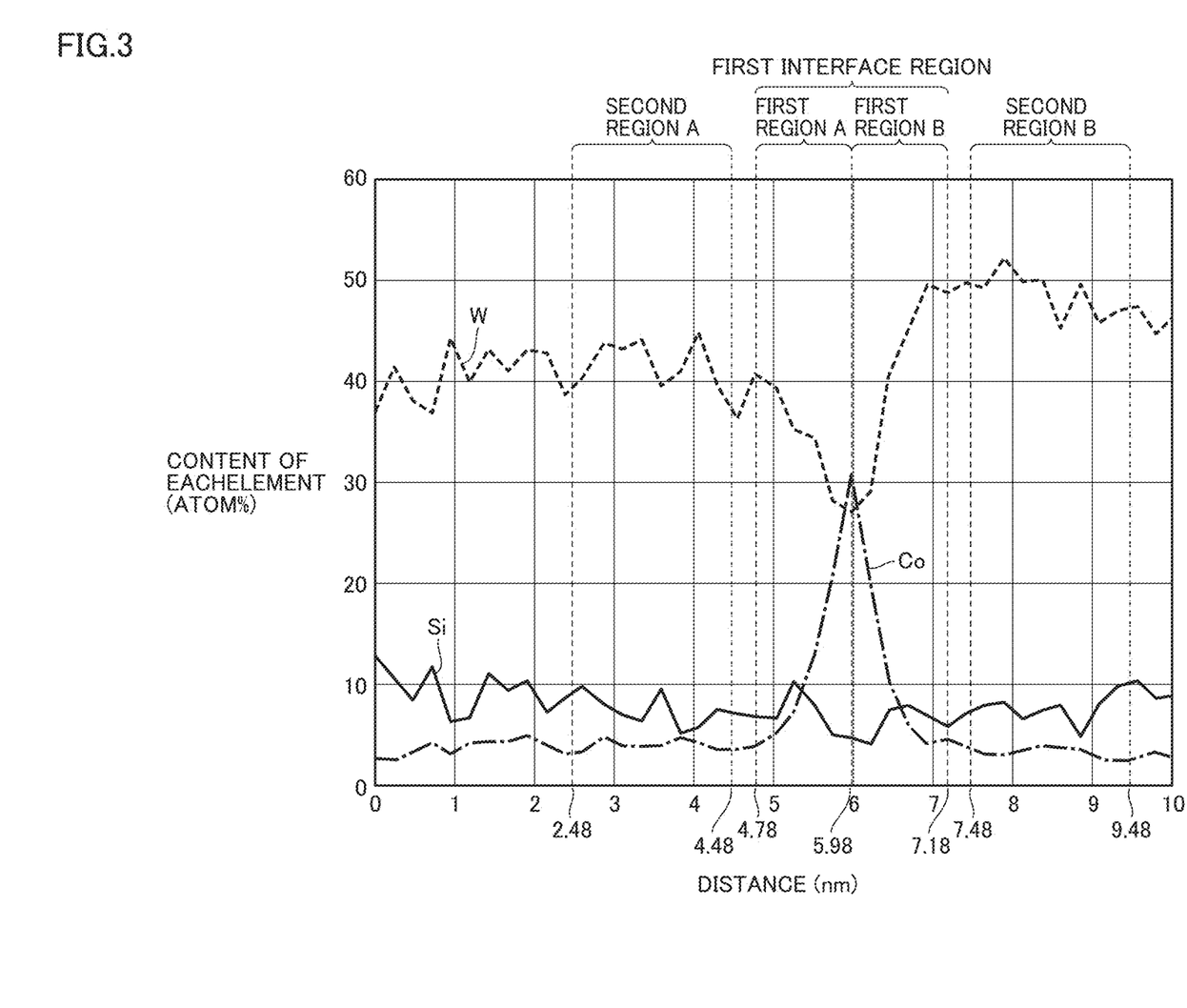
FIG. 3 shows a first graph, which illustrates a method for confirming that a first element is not segregated in a first interface region.

FIG. 3 is an example of the first graph. In FIG. 3, the horizontal axis (X axis) indicates the distance from the starting point of the measurement (nm), and the vertical axis (Y axis) indicates the content of each element (atom %). In the cemented carbide shown in FIG. 3, the first element is silicon (Si).

(D2) In the first graph, the peak position of cobalt is identified. In the present disclosure, the peak position of cobalt is referred to as a first interface. The first interface is formed between the first tungsten carbide grain and second tungsten carbide grain that are adjacent to each other. In the first graph of FIG. 3, the first interface is positioned at 5.98 nm on the X axis.

In the first graph, a first region A with a distance of 1.20 nm or less from the first interface to the first tungsten carbide grain side and a first region B with a distance of 1.20 nm or less from the first interface to the second tungsten carbide grain side are identified. In the present disclosure, a region composed of the first region A and the first region 3 is the first interface region. In the first graph of FIG. 3, the first interface region is positioned in the region of 4.78 to 7.18 nm on the X axis. In the present disclosure, the first interface region between the tungsten carbide grains that are adjacent to each other can also be expressed as first interface region positioned between the tungsten carbide grains that are adjacent to each other.

In the first graph, a second region A with a distance of 1.50 nm or more and 3.50 nm or less from the first interface to the first tungsten carbide grain side and a second region B with a distance of 1.50 nm or more and 3.50 nm or less from the first interface to the second tungsten carbide grain side are identified. In the first graph of FIG. 3, the second region A is positioned in the region of 2.48 to 4.48 nm on the X axis, and the second region B is positioned in the region of 7.48 to 9.48 nm on the X axis.

(E2) Based on the first graph, the average B (atom %) of the content of the first element in a baseline region composed of the second region A and the second region B is calculated. In the first graph, the maximum value A (atom %) of the content of the first element in the first interface region is measured. In the case where the proportion A/B of the maximum value A to the average B is less than 3, it is confirmed that the first element is not segregated in the first interface region between the tungsten carbide grains that are adjacent to each other in the cemented carbide.

In the first graph of FIG. 3, the average B of the content of silicon (first element) in the baseline region composed of the second region A and the second region B is 7.68 atom %, and the maximum value A of the content of silicon (first element) in the first interface region is 6.75 atom %. Since the A/B is 0.9 in the cemented carbide shown in FIG. 3, it is confirmed that the first element is not segregated in the first interface region between the tungsten carbide grains that are adjacent to each other in the cemented carbide.

(F2) In the cemented carbide, five first images that are not overlapped with each other are arbitrarily acquired, first graphs are obtained based on the respective first images, and the analysis described above is repeated. In the case where no segregation of the first element in the first interface region is confirmed in four or more first graphs, it is judged that the first element is not segregated in the first interface region between the tungsten carbide grains that are adjacent to each other in the cemented carbide.

In the present disclosure, a method for confirming that the first element is not segregated in a second interface region between the tungsten carbide grain and binder phase that are adjacent to each other will be described with reference to FIG. 4.

(A3) By the same method as (A2) described above in the method for confirming that the first element is not segregated in the first interface region, a first image is obtained. In the first image, an interface between the tungsten carbide grain and binder phase that are adjacent to each other is arbitrarily selected.

(B3) Next, positioning is performed so that the selected interface passes near the center of the image, and observation is performed adjusting the observation magnification so that the field size is 5 nm×5 nm, thereby obtaining a third image. In the third image, the extending direction in which the interface extends is confirmed. In the direction perpendicular to the extending direction and from the tungsten carbide grain toward the binder phase, line analysis is performed with a TEM-EDX to obtain a graph in which the distribution of cobalt, tungsten, and the first element is measured (hereinafter, also referred to as second graph). In the case where the cemented carbide comprises two or more first elements, the distribution of each element is measured. Here, the direction perpendicular to the extending direction of the interface means the direction along a straight line that intersects at an angle of 90°±5° to the tangent line in the extending direction. The measurement conditions at the time of the third image acquisition were as follows: an acceleration voltage of 200 kV, a camera length of 10 cm, a pixel number of 128-128 pixels, and a dwell time of 0.02 to 3 s/pixel.

Figure 4:
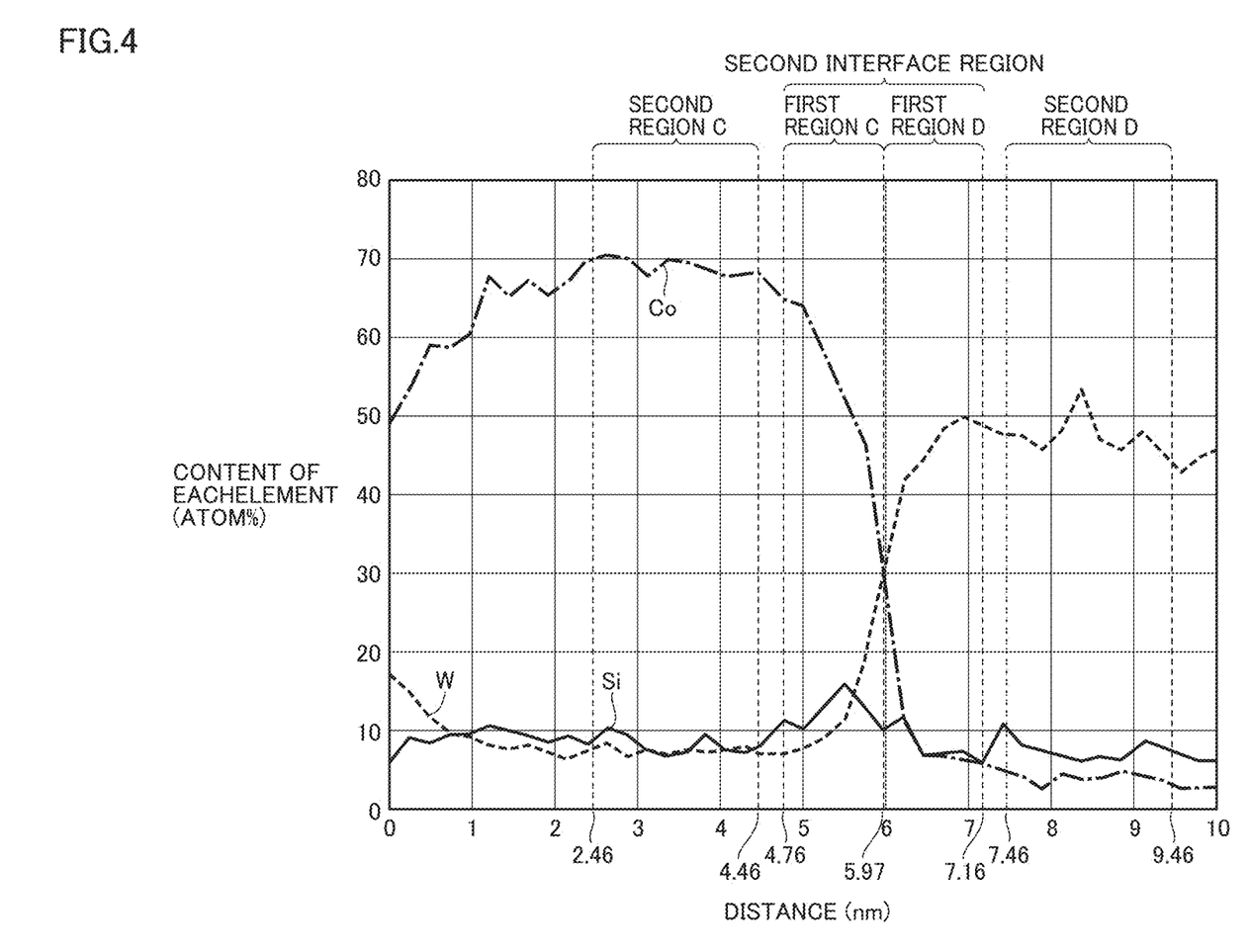
FIG. 4 shows a second graph, which illustrates a method for confirming that a first element is not segregated in a second interface region.

FIG. 4 is an example of the second graph. In FIG. 4, the horizontal axis (X axis) indicates the distance from the starting point of the measurement (nm), and the vertical axis (Y axis) indicates the content of each element (atom %). In the cemented carbide shown in FIG. 4, the first element is silicon (Si).

In the second graph, the position where the content of tungsten intersects with the content of cobalt is identified. In the present disclosure, the position where the content of tungsten intersects with the content of cobalt is referred to as a second interface. The second interface is formed between the tungsten carbide grain and binder phase that are adjacent to each other. In the second graph of FIG. 4, the second interface is positioned at 5.97 nm on the X axis.

In the second graph, a first region C with a distance of 1.20 nm or less from the second interface to the tungsten carbide grain side and a first region D with a distance of 1.20 nm or less from the second interface to the binder phase side are identified. In the present disclosure, a region composed of the first region C and the first region D is the second interface region. In the second graph of FIG. 4, the second interface region is positioned in the region of 4.76 to 7.16 nm on the X axis. In the present disclosure, the second interface region between the tungsten carbide grain and binder phase that are adjacent to each other can also be expressed as second interface region positioned between the tungsten carbide grain and binder phase that are adjacent to each other.

In the second graph, a second region C with a distance of 1.50 nm or more and 3.50 nm or less from the second interface to the tungsten carbide grain side and a second region D with a distance of 1.50 nm or more and 3.50 nm or less from the second interface to the binder phase side are identified. In the second graph of FIG. 4, the second region C is positioned in the region of 2.46 to 4.46 nm on the X axis, and the second region D is positioned in the region of 7.46 to 9.46 nm on the X axis.

Based on the second graph, the average D (atom %) of the content of the first element in a baseline region composed of the second region C and the second region D is calculated. In the second graph, the maximum value C (atom %) of the content of the first element in the second interface region is measured. In the case where the proportion C/D of the maximum value C to the average D is less than 3, it is confirmed that the first element is not segregated in the second interface region between the tungsten carbide grain and binder phase that are adjacent to each other in the cemented carbide.

(C3) In the cemented carbide, five first images that are not overlapped with each other are arbitrarily acquired, second graphs are obtained based on the respective first images, and the analysis described above is repeated. In the case where no segregation of the first element in the second interface region is confirmed in four or more second graphs, it is judged that the first element is not segregated in the second interface region between the tungsten carbide grain and binder phase that are adjacent to each other in the cemented carbide.

It has been confirmed that, as long as measurement is performed on the same sample, even if the cut-out location for the cross-section of the cemented carbide is arbitrarily set, the first image is arbitrarily acquired on the cross-section, and the presence or absence of segregation of the first element in the first interface region and the second interface region is confirmed multiple times according to the above procedure while changing the region for line analysis, there is little variation in the results for the presence or absence of segregation of the first element in the first interface region and the second interface region Therefore, as long as it is confirmed that the methods for confirming segregation of the first element described above are performed on the cemented carbide and the first element is confirmed not to be segregated in the first interface region and the second interface region, it is presumed that the interface strength between the tungsten carbide grains and the interface strength between the tungsten carbide grain and binder phase in the cemented carbide are improved.

<Intermetallic Compound and First Compound>

The cemented carbide of Embodiment 1 may be free from an intermetallic compound composed of two or more elements selected from the group consisting of the first element, cobalt, and tungsten (hereinafter, also referred to as "first interalloy compound"), and a first compound composed of at least one element selected from the group consisting of the first element, cobalt, and tungsten, and at least one element selected from the group consisting of carbon, nitrogen, and oxygen. Here, the first compound does not include tungsten carbide. According to this, a decrease in the strength of the cemented carbide is suppressed.

Examples of the first intermetallic compound include $Co_2Si$, $Co_3Si$, and $CoSi$.

Examples of the first compound include $Co_3W_3C$ and $Co_6W_6C$.

In the present disclosure, structure observation and EDX analysis for the cross-section of the cemented carbide confirm that the cemented carbide is free from both the first intermetallic compound and the first compound.

<Method for Producing Cemented Carbide>

The cemented carbide of Embodiment 1 can be produced by performing a raw material powder preparation step, a mixing step, a molding step, a sintering step, a first cooling step, a hot isostatic pressing (HIP) step, and a second cooling step in the order described above. Each step will be described below.

<Preparation Step>

The preparation step is a step of preparing raw material powders of the cemented carbide. Examples of the raw material powders include a tungsten carbide powder (hereinafter, also referred to as "WC powder"), a cobalt (Co) powder, a first element powder, and an alloy powder of the first element and cobalt. Examples of the first element powder include a silicon (Si) powder, a phosphorus (P) powder, a germanium (Ge) powder, a tin (Sn) powder, a rhenium (Re) powder, a ruthenium (Ru) powder, an osmium (Os) powder, an iridium (Ir) powder, and a platinum (Pt) powder. As the raw material powders, a nickel (Ni) powder, a niobium carbide (NbC) powder, a tantalum carbide (TaC) powder, a titanium carbonitride (TiCN) powder, and other powders can be further prepared. As these raw material powders, those commercially available can be used. The average grain size of these raw material powders is not particularly restricted, and it can be 0.5 to 5 μm, for example. The average grain size of the raw material powders means an average grain size measured by the Fisher Sub-Sieve Sizer (FSSS) method. The average grain size is measured using "Sub-Sieve Sizer Model 95"™ manufactured by Fisher Scientific International, Inc.

<Mixing Step>

The mixing step is a step of mixing each raw material powder prepared in the preparation step at a predetermined proportion. A mixed powder in which each raw material powder is mixed is obtained by the mixing step. The mixing proportion of each raw material powder is adjusted as appropriate depending on the composition of the target cemented carbide.

For the mixing of each raw material powder, conventionally known mixing methods such as attritors, ball mills, and bead mills can be used. The mixing conditions used can also be conventionally known conditions. The mixing time can be 2 hours or longer and 20 hours or shorter, for example.

After the mixing step, the mixed powder may be granulated as necessary. By granulating the mixed powder, it is easy to fill the mixed powder into a die or mold during the molding step described later. Known granulation methods can be applied for the granulation, and for example, a commercially available granulator such as a spray dryer can be used.

<Molding Step>

The molding step is a step of molding the mixed powder obtained in the mixing step into a shape for cutting tools to obtain a molded body. The molding method and molding conditions in the molding step are not particularly restricted as long as general methods and conditions may be employed.

<Sintering Step>

The sintering step is a step of sintering the molded body obtained in the molding step to obtain a cemented carbide intermediate. The sintering conditions in Embodiment 1 are as follows. The molded body is heated to 1360° C. at a temperature increase rate of 30° C./min and held at 1360° C. for 15 minutes.

<First Cooling Step>

The first cooling step is a step of cooling the cemented carbide intermediate after the sintering step Specifically, the cemented carbide intermediate is cooled to 800° C. The temperature decrease rate is −20° C./min.

<HIP Step>

The HIP step is a step of performing a HIP treatment on the cemented carbide intermediate after the first cooling step. The conditions for the HIP step are as follows. The cemented carbide intermediate is held under the conditions of 200 MPa and 1310° C. for 15 minutes.

<Second Cooling Step>

The second cooling step is a step of cooling the cemented carbide intermediate after the HIP step. Specifically, the cemented carbide intermediate is cooled to 800° C. The temperature decrease rate is −30° C./min. Thereafter, through gradual cooling, the cemented carbide of Embodiment 1 can be obtained. The temperature decrease rate at the time of gradual cooling are not particularly restricted as long as general conditions may be employed.

Characteristics of Method for Producing Cemented Carbide of Embodiment 1

In the method for producing the cemented carbide of Embodiment 1, the temperature increase rate in the sintering step is 30° C./min, which is larger than the general temperature increase rate. Also, the temperature decrease rate in the second cooling step is −30° C./min, which is larger than the general temperature decrease rate. Under these conditions, the cemented carbide of Embodiment 1 can be produced in which the binder phase contains 40% by mass or more of cobalt and at least one first element selected from the group consisting of silicon, phosphorus, germanium, tin, rhenium, ruthenium, osmium, iridium, and platinum, and the first element is not segregated in the first interface region and the second interface region. The fact that the cemented carbide of the present disclosure can be realized by employing such a temperature increase rate in the sintering step and such a temperature decrease rate in the second cooling step has been found by the present inventors as a result of careful examination.

Embodiment 2: Cutting Tool

A cutting tool of one embodiment of the present disclosure (hereinafter, also referred to as "Embodiment 2") comprises a cutting edge composed of the cemented carbide of Embodiment 1. In the present disclosure, the cutting edge means the portion involved in cutting. More specifically, the cutting edge means the region bounded by the cutting edge ridgeline and a hypothetical plane at a distance of 0.5 mm or 2 mm from the cutting edge ridgeline to the cemented carbide side.

Figure 5:
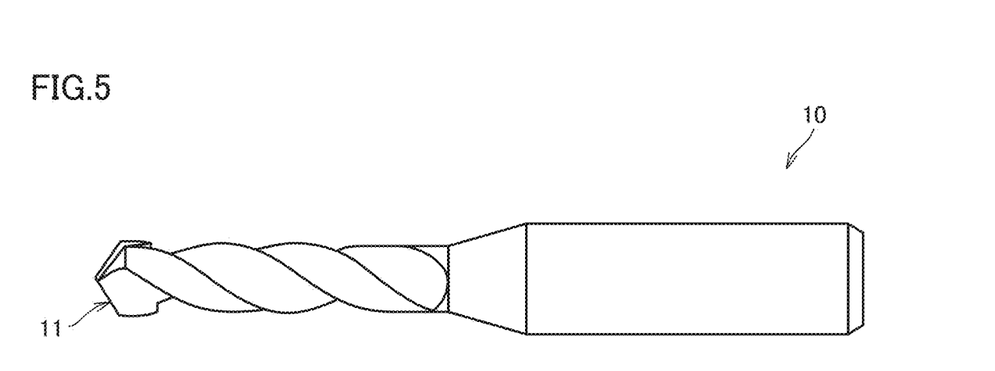
FIG. 5 is a schematic diagram of a cutting tool according to Embodiment 2.

As the cutting tool, for example, cutting bits, drills, end mills, indexable cutting inserts for milling, indexable cutting inserts for turning, metal saws, gear cutting tools, reamers, or taps, etc. can be exemplified. In particular, as shown in FIG. 5, a cutting tool 10 of Embodiment 2 can exert excellent effects in the case where it is used as a small-diameter drill for processing printed circuit boards A cutting edge 11 of cutting tool 10 shown in FIG. 5 is composed of the cemented carbide of Embodiment 1.

In the cutting tool of Embodiment 2, the cemented carbide of Embodiment 1 may constitute the entirety of this tool, or may constitute part of it. Here, "constitute part of it" indicates an aspect in which the cemented carbide of Embodiment 1 is brazed to a predetermined position of any base body to make a cutting edge portion, etc.

The cutting tool of Embodiment 2 may further comprise a hard film covering at least part of the surface of a base body composed of cemented carbide. As the hard film, for example, diamond-like carbon or diamond can be used.

The cutting tool of Embodiment 2 can be obtained by molding the cemented carbide of Embodiment 1 into the desired shape.

[Supplement 1]

In the cemented carbide of the present disclosure, in the case where the tungsten carbide grains that are adjacent to each other are defined as a first tungsten carbide grain and a second tungsten carbide grain, a first interface is formed between the first tungsten carbide grain and the second tungsten carbide grain, and a first interface region may be composed of a first region A with a distance of 1.2 nm or less from the first interface to the first tungsten carbide grain side and a first region B with a distance of 1.2 nm or less from the first interface to the second tungsten carbide grain side.

[Supplement 2]

In the cemented carbide of the present disclosure, a second interface is formed between the tungsten carbide grain and binder phase that are adjacent to each other, and a second interface region may be composed of a first region C with a distance of 1.2 nm or less from the second interface to the tungsten carbide grain side and a first region D with a distance of 1.2 nm or less from the second interface to the binder phase side.

EXAMPLES

The present embodiment will be described more specifically with reference to examples. However, the present embodiment is not limited by these examples.

[Production of Cemented Carbide]

A cemented carbide of each sample was produced by the following procedure

<Preparation Step>

As the raw material powders, a WC powder (average grain size: 1 μm), a Co powder (average grain size: 1 μm), a first element powder, a Ni powder (average grain size: 1 μm), a TiCN powder (average grain size: 1 μm), a TaC powder (average grain size: 1 μn), and a NbC powder (average grain size: 1 μm) were prepared. As the first element powder, a silicon (Si) powder (average grain size: 1 μm), a phosphorus (P) powder (average grain size: 1 μm), a germanium (Ge) powder (average grain size, 1 μm), a tin (Sn) powder (average grain size: 1 μm), a rhenium (Re) powder (average grain size: 1 μm), a ruthenium (Ru) powder (average grain size, 1 μm), an osmium (Os) powder (average grain size, 1 μm), an iridium (Ir) powder (average grain size: 1 μm), and a platinum (Pt) powder (average grain size: 1 μm) were prepared.

<Mixing Step>

Each raw material powder was mixed in the proportion described in Table 1 for 10 hours using an attritor to obtain a mixed powder. The proportion (% by mass) of each raw material powder described in Table 1 is the proportion in the case where the entire mixed powder is 100% by mass.

[Table 1]

TABLE 1

| Sample No. | Mixing step | | | | | |
|---|---|---|---|---|---|---|
| | WC powder % by mass | Co powder % by mass | First element powder Type | First element powder % by mass | Other powder Type | Other powder % by mass |
| 1 | 98.99 | 1 | Si | 0.01 | — | — |
| 2 | 89.9 | 10 | Si | 0.1 | — | — |
| 3 | 89.4 | 10 | Si | 0.6 | — | — |
| 4 | 89.4 | 4.2 | Si | 0.6 | Ni | 5.8 |
| 5 | 85.4 | 10 | Si | 0.6 | TiCN | 4 |
| 6 | 85.4 | 10 | Si | 0.6 | TaC | 4 |
| 7 | 85.4 | 10 | Si | 0.6 | NbC | 4 |
| 8 | 84.2 | 15 | Si | 0.8 | — | — |
| 9 | 89.4 | 10 | P | 0.6 | — | — |
| 10 | 89.4 | 10 | Ge | 0.6 | — | — |
| 11 | 89.9 | 10 | Sn | 0.1 | — | — |
| 12 | 89.4 | 10 | Re | 0.6 | — | — |
| 13 | 89.4 | 10 | Ru | 0.6 | — | — |
| 14 | 89.4 | 10 | Os | 0.6 | — | — |
| 15 | 89.4 | 10 | Ir | 0.6 | — | — |
| 16 | 89.4 | 10 | Pt | 0.6 | — | — |
| 17 | 89.4 | 10 | Si, Re | Si: 0.4 Re: 0.2 | — | — |
| 101 | 90.0 | 10 | — | — | — | — |
| 102 | 90.0 | 10 | — | — | — | — |
| 103 | 89.4 | 3.9 | Si | 0.6 | Ni | 6.1 |
| 104 | 89.4 | 10 | Ru | 0.6 | — | — |

<Molding Step>

The mixed powder was pressed to obtain a round bar-shaped molded body.

<Sintering Step>

The molded body was heated to the temperature described in the "Holding temperature" column at the temperature increase rate described in the "Temperature increase rate" column, and held at that temperature for the time described in the "Holding time" column of "Sintering step" in Table 2. As a result, a cemented carbide intermediate was obtained.

<First Cooling Step>

The cemented carbide intermediate after the sintering step was cooled to 800° C. at the temperature decrease rate described in the "Temperature decrease rate" column of "First cooling step" in Table 2.

[Table 2]

TABLE 2

| Sample No. | Sintering step | | | First cooling step |
|---|---|---|---|---|
| | Temperature increase rate ° C./min | Holding temperature ° C. | Holding time min | Temperature decrease rate ° C./min |
| 1 | 30 | 1360 | 16 | −20 |
| 2 | 30 | 1360 | 15 | −20 |
| 3 | 30 | 1360 | 15 | −20 |
| 4 | 30 | 1360 | 15 | −20 |
| 5 | 30 | 1360 | 15 | −20 |
| 6 | 30 | 1360 | 15 | −20 |
| 7 | 30 | 1360 | 15 | −20 |
| 8 | 30 | 1360 | 15 | −20 |
| 9 | 30 | 1360 | 15 | −20 |
| 10 | 30 | 1360 | 15 | −20 |
| 11 | 30 | 1360 | 15 | −20 |
| 12 | 30 | 1360 | 15 | −20 |
| 13 | 30 | 1360 | 15 | −20 |
| 14 | 30 | 1360 | 15 | −20 |
| 15 | 30 | 1360 | 15 | −20 |
| 16 | 30 | 1360 | 15 | −20 |
| 17 | 30 | 1360 | 15 | −20 |

TABLE 2-continued

| | Sintering step | | | First cooling step |
|---|---|---|---|---|
| Sample No. | Temperature increase rate °C./min | Holding temperature °C. | Holding time min | Temperature decrease rate °C./min |
| 101 | 30 | 1360 | 15 | −20 |
| 102 | 15 | 1360 | 60 | −10 |
| 103 | 30 | 1360 | 15 | −20 |
| 104 | 15 | 1360 | 60 | −10 |

<HIP Step>

A HIP treatment was performed on the cemented carbide intermediate after the first cooling step. In the HIP treatment, the cemented carbide intermediate was held at the pressure described in the "Pressure" column and at the temperature described in the "Temperature" column for the time described in the "Time" column of "HIP step" in Table 3.

<Second Cooling Step>

The cemented carbide intermediate after the HIP step was cooled to 800° C. at the temperature decrease rate described in the "Temperature decrease rate" column of "Second cooling step" in Table 3. Thereafter, through gradual cooling, a cemented carbide of each sample was obtained.

[Table 3]

TABLE 3

| | HIP step | | | Second cooling step |
|---|---|---|---|---|
| Sample No. | Pressure MPa | Temperature °C. | Time min | Temperature decrease rate °C./min |
| 1 | 200 | 1310 | 15 | −30 |
| 2 | 200 | 1310 | 15 | −30 |
| 3 | 200 | 1310 | 15 | −30 |
| 4 | 200 | 1310 | 15 | −30 |
| 5 | 200 | 1310 | 15 | −30 |
| 6 | 200 | 1310 | 15 | −30 |
| 7 | 200 | 1310 | 15 | −30 |
| 8 | 200 | 1310 | 15 | −30 |
| 9 | 200 | 1310 | 15 | −30 |
| 10 | 200 | 1310 | 15 | −30 |
| 11 | 200 | 1310 | 15 | −30 |
| 12 | 200 | 1310 | 15 | −30 |
| 13 | 200 | 1310 | 15 | −30 |
| 14 | 200 | 1310 | 15 | −30 |
| 16 | 200 | 1310 | 15 | −30 |
| 16 | 200 | 1310 | 15 | −30 |
| 17 | 200 | 1310 | 15 | −30 |
| 101 | 200 | 1310 | 15 | −30 |
| 102 | 10 | 1310 | 60 | −10 |
| 103 | 200 | 1310 | 15 | −30 |
| 104 | 10 | 1310 | 60 | −10 |

[Evaluation of Cemented Carbide]

<Content (% by Volume) of Tungsten Carbide Grains and Content (% by Volume) of Binder Phase in Cemented Carbide>

The content (% by volume) of the tungsten carbide grains and the content (% by volume) of the binder phase in the cemented carbide of each sample were measured. A specific measurement method is as described in Embodiment 1. The results are shown in the "WC grain content" and "Binder phase content" columns of "Cemented carbide" in Table 4. Furthermore, the total of the content of the tungsten carbide grains and the content of the binder phase in the cemented carbide is shown in the "WC grain+binder phase content" column of "Cemented Carbide" in Table 4. In Table 4, cemented carbides in which the "WC grain+binder phase content" column is less than 100% by volume were confirmed to further comprise TiCN, TaC, or NbC.

<Presence or Absence of First Intermetallic Compound and First Compound>

In the cemented carbide of each sample, the presence or absence of the first intermetallic compound and the first compound was confirmed by structure observation and EDX analysis for the cross-section of the cemented carbide. The results are shown in the "First intermetallic compound/first compound" column of "Cemented carbide" in Table 4. In the case where neither the first intermetallic compound nor the first compound is confirmed, "Absent" is noted, and in the case where at least any of the first intermetallic compound and the first compound is confirmed, "Present" is noted.

<Content of Cobalt in Cemented Carbide>

In the cemented carbide of each sample, the content of cobalt in the cemented carbide was measured. A specific measurement method is as described in Embodiment 1. The results are shown in the "Co content" column of "Cemented carbide" in Table 4.

Table 4

TABLE 4

| | Cemented carbide | | | | |
|---|---|---|---|---|---|
| Sample No. | WC grain content % by volume | Binder phase content % by volume | WC grain + binder phase content % by volume | First intermetallic compound/ first compound Present/ absent | Co content % by mass |
| 1 | 98.2 | 1.8 | 100 | Absent | 1 |
| 2 | 83.2 | 16.8 | 100 | Absent | 10 |
| 3 | 80.6 | 19.4 | 100 | Absent | 10 |
| 4 | 80.6 | 19.4 | 100 | Absent | 6 |
| 5 | 73.5 | 16.1 | 89.6 | Absent | 10 |
| 6 | 78.6 | 17.2 | 95.8 | Absent | 10 |
| 7 | 76.4 | 16.8 | 93.2 | Absent | 10 |
| 8 | 83.0 | 17.0 | 100 | Absent | 15 |
| 9 | 77.4 | 22.6 | 100 | Absent | 10 |
| 10 | 91.0 | 9.0 | 100 | Absent | 10 |
| 11 | 93.5 | 6.5 | 100 | Absent | 10 |
| 12 | 97.6 | 2.4 | 100 | Absent | 10 |
| 13 | 96.0 | 4.0 | 100 | Absent | 10 |
| 14 | 97.8 | 2.2 | 100 | Absent | 10 |
| 15 | 97.8 | 2.2 | 100 | Absent | 10 |
| 16 | 97.8 | 2.2 | 100 | Absent | 10 |
| 17 | 98.0 | 2.0 | 100 | Absent | 10 |
| 101 | 83.7 | 16.3 | 100 | Absent | 10 |
| 102 | 83.7 | 16.3 | 100 | Absent | 10 |
| 103 | 80.6 | 19.4 | 100 | Absent | 6.1 |
| 104 | 96.0 | 4.0 | 100 | Absent | 10 |

<Cobalt Content in Blinder Phase>

In the cemented carbide of each sample, the cobalt content in the binder phase was measured. A specific measurement method is as described in Embodiment 1. The results are shown in the "Co content" column of "Binder phase" in Table 5.

<Type of First Element and {M1/(M1+M2)}×100>

In the binder phase of the cemented, carbide of each sample, the type of the first element and the percentage {M1/(M1+M2)}×100 of the mass M1 of the first element to the total M1 M2 of the mass M1 of the first element and the mass M2 of cobalt were measured. A specific measurement method is as described in Embodiment 1. The results are shown in the "First element" column and the "{M1/(M1+M2)}×100" column of "Binder phase" in Table 5. Samples with "-" noted in the "First element" column indicate that they do not contain the first element.

<Presence or Absence of Segregation of First Element in First Interface Region and Second Interface Region>

In the cemented carbide of each sample, the presence or absence of segregation of the first element in the first interface region and the second interface region was confirmed A specific confirmation method is as described in Embodiment 1. The results are shown in the "first interface region" and "second interface region" columns of "Segregation of first element" in Table 5.

[Cutting Test]

The round bar composed of the cemented carbide of each sample was processed to produce a drill for processing printed circuit boards (PCB (printed circuit board) drill) with a drill diameter of φ0.10 mm. Using the PCB drill, drilling was performed on a commercially available printed circuit board for semiconductor packaging, and the hole positional accuracy was evaluated. The printed circuit board used was made of two 0.4-mm-thick boards that were overlapped. The drilling conditions were as follows: a rotation speed of 160 krpm, a feed rate of 2.0 m/min, and a withdrawal speed of 25 m/min. The hole positional accuracy (ave+3σ (μm)) was measured when the number of holes drilled was 8000 times (8000 hit). The measurement was performed three times, and the average hole positional accuracy of the three measurements was calculated. The results are shown in the "Cutting test" column in Table 5. A smaller numerical value for the hole positional accuracy indicates that the cutting tool has superior hole positional accuracy and a longer tool life.

Table 5

TABLE 5

| Sample No. | Binder phase | | | Segregation of first element | | Cutting test Hole positional accuracy μm |
|---|---|---|---|---|---|---|
| | Co content % by mass | First element Type | (M1/ (M1 + M2)) × 100 % | First interface region Present/ absent | Second interface region Present/ absent | |
| 1 | 99 | Si | 1.0 | Absent | Absent | 37 |
| 2 | 99 | Si | 1.0 | Absent | Absent | 45 |
| 3 | 94 | Si | 5.5 | Absent | Absent | 43 |
| 4 | 40 | Si | 5.4 | Absent | Absent | 48 |
| 5 | 94 | Si | 5.5 | Absent | Absent | 42 |
| 6 | 94 | Si | 5.5 | Absent | Absent | 43 |
| 7 | 94 | Si | 5.5 | Absent | Absent | 43 |
| 8 | 95 | Si | 5.0 | Absent | Absent | 47 |
| 9 | 94 | P | 5.5 | Absent | Absent | 45 |
| 10 | 94 | Ge | 5.5 | Absent | Absent | 42 |
| 11 | 99 | Sn | 1.2 | Absent | Absent | 43 |
| 12 | 94 | Re | 5.5 | Absent | Absent | 41 |
| 13 | 94 | Ru | 5.5 | Absent | Absent | 40 |
| 14 | 94 | Os | 5.6 | Absent | Absent | 41 |
| 15 | 94 | Ir | 5.6 | Absent | Absent | 40 |
| 16 | 94 | Pt | 5.7 | Absent | Absent | 40 |
| 17 | 94 | Si, Re | 5.7 | Absent | Absent | 41 |
| 101 | 100 | — | 0 | Absent | Absent | 62 |
| 102 | 100 | — | 0 | Absent | Absent | 65 |
| 103 | 37 | Si | 5.3 | Absent | Absent | 60 |
| 104 | 94 | Ru | 0.9 | Present | Present | 60 |

Discussion

The cemented carbides and cutting tools of Sample 1 to Sample 17 correspond to Examples. The cemented carbides and cutting tools of Sample 101 to Sample 104 correspond to Comparative Examples. It was confirmed that the cutting tools of Sample 1 to Sample 17 had superior hole positional accuracy and a longer tool life compared to the cutting tools of Sample 101 to Sample 104.

Although the embodiments and Examples of the present disclosure have been described above, it has been planned from the beginning that the configurations of the embodiments and Examples described above may be appropriately combined or modified in various ways.

It should be understood that the embodiments and Examples disclosed herein are illustrative in all respects and are not restrictive. The scope of the present invention is defined not by the above-described embodiments and Examples but by the claims, and is intended to include meanings equivalent to the claims and all modifications within the scope.

REFERENCE SIGNS LIST

1 Tungsten carbide grain; 2 Binder phase; 3 Cemented carbide; 4 Interface; 10 Cutting tool; 11 Cutting edge.

The invention claimed is:

1. A cemented carbide comprising a plurality of tungsten carbide grains and a binder phase,
wherein the cemented carbide comprises the tungsten carbide grains and the binder phase in a total of 89% by volume or more,
the cemented carbide comprises 1.5% by volume or more and 23% by volume or less of the binder phase,
the binder phase contains 40% by mass or more of cobalt,
the binder phase contains silicon, and the binder phase further contains at least one first element selected from the group consisting of phosphorus, and tin,
the first element is not segregated in a first interface region between the tungsten carbide grains that are adjacent to each other, and
the first element is not segregated in a second interface region between the tungsten carbide grain and binder phase that are adjacent to each other,
in the binder phase, a percentage {M1/(M1+M2)}×100 of a mass M1 of the first element to a total M1+M2 of the mass M1 of the first element and a mass M2 of cobalt is 1% or more and 6% or less.

2. The cemented carbide according to claim 1,
wherein the cemented carbide is free from:
an intermetallic compound composed of two or more elements selected from the group consisting of the first element, cobalt, and tungsten; and
a first compound including at least one element selected from the group consisting of the first element, cobalt, and tungsten, and at least one element selected from the group consisting of carbon, nitrogen, and oxygen, and the first compound does not include tungsten carbide.

3. A cutting tool comprising a cutting edge comprising the cemented carbide according to claim 1.

4. The cemented carbide according to claim 1, wherein the binder phase includes at least one second element selected from the group consisting of iron, nickel and chromium.

5. The cemented carbide according to claim 1, wherein in the binder phase, cobalt has a peak position in the first interface region.

* * * * *